Sept. 18, 1956        A. B. SKROMME        2,763,115
HARVESTER UNIT MOUNTING FRAME
Filed Jan. 13, 1954        2 Sheets-Sheet 1
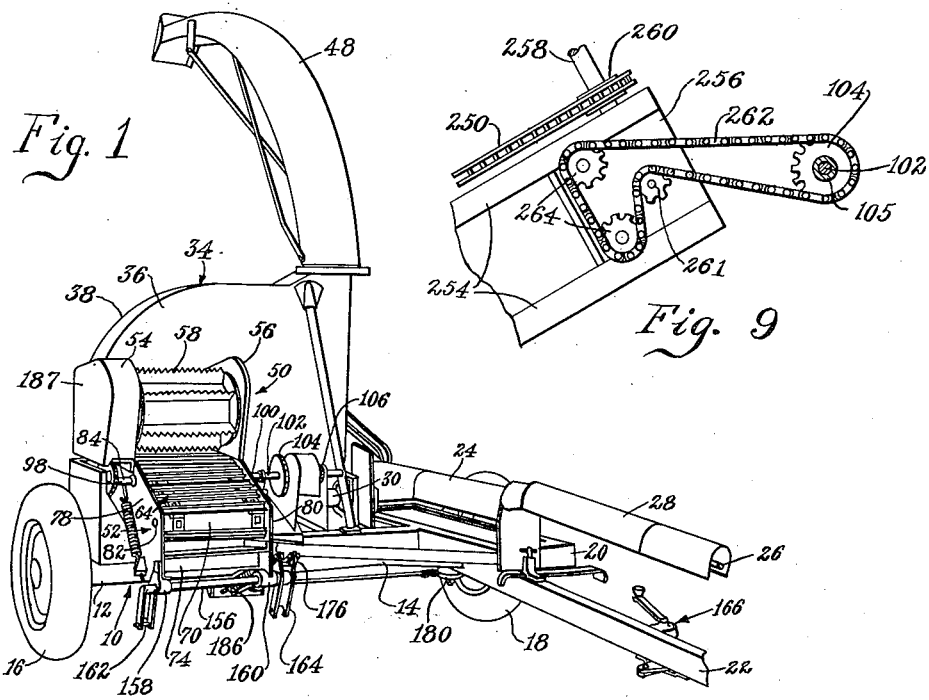
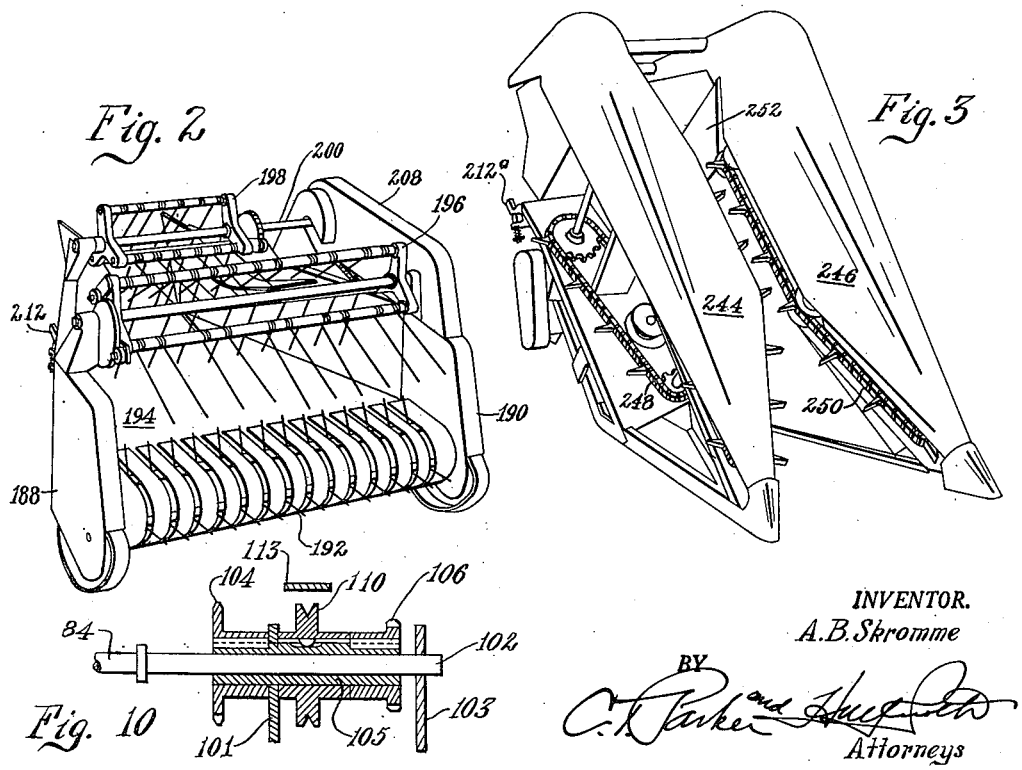
INVENTOR.
A. B. Skromme

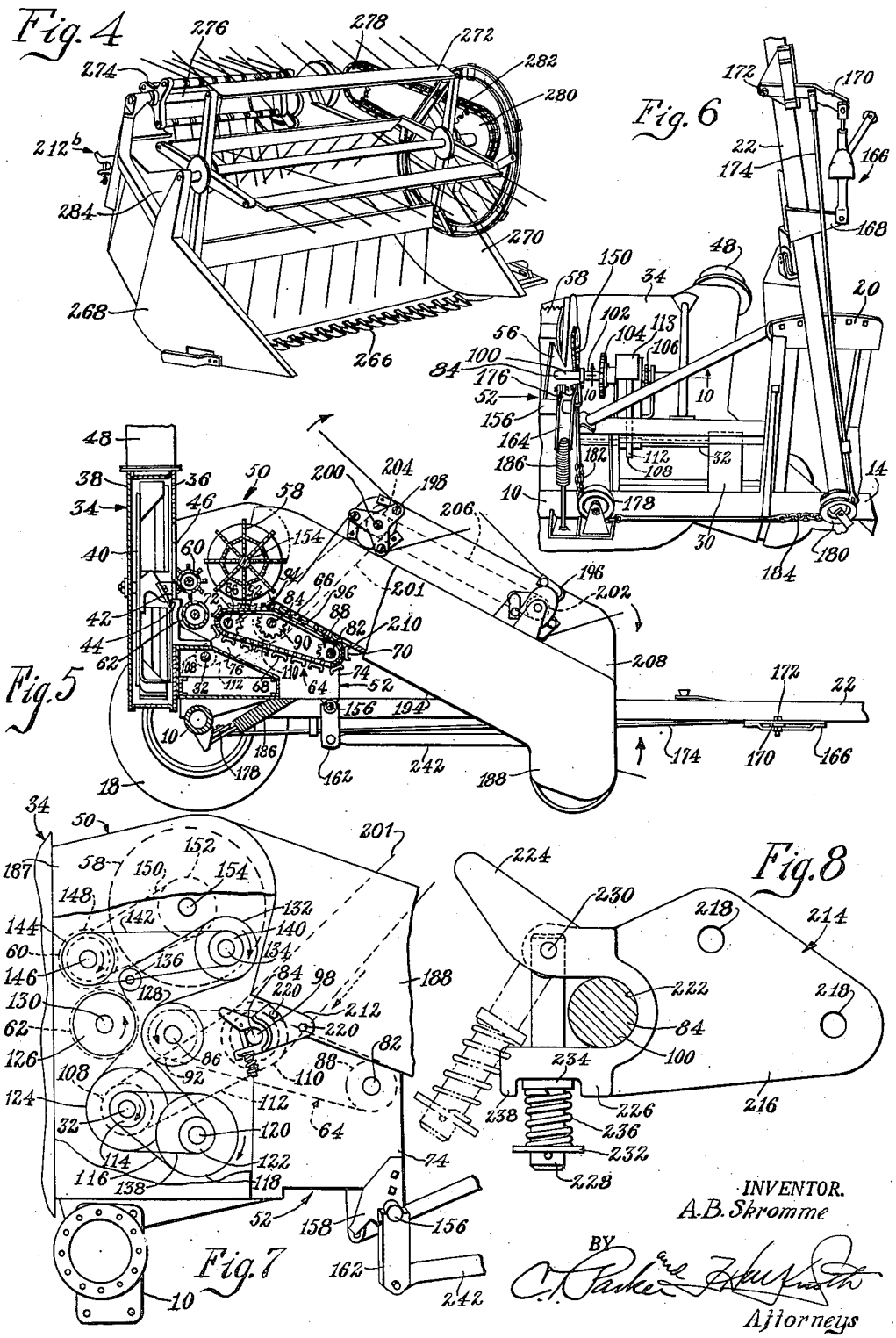

United States Patent Office 2,763,115
Patented Sept. 18, 1956

2,763,115

HARVESTER UNIT MOUNTING FRAME

Arnold B. Skromme, Ottumwa, Iowa, assignor to Deere Manufacturing Co., Dubuque, Iowa, a corporation of Iowa Application January 13, 1954, Serial No. 403,704

11 Claims. (Cl. 56—16)

This invention relates to a harvester and more particularly to a harvester of the so-called forage or ensilage type.

Harvesters of the general character referred to above are utilized for gathering and reducing crops for silage and other forage as distinguished from those harvesting operations in which merely the fruit of the crop is collected. Forage harvesters may take many forms, depending upon whether they are used for harvesting field crops of the grass type, such as hay, or row crops of the stalk type, such as corn. Because of the variety of conditions under which a machine may be used, it has become somewhat commonplace to provide the machine in the form of a base unit to which one or more attachments may be mounted, the most familiar attachments being the pickup attachment, the sickle bar attachment and the row-crop attachment. Because each of these attachments has its own characteristics, the problem of designing a basic mobile frame that will handle all three is not an easy one to solve. According to the present invention, however, an improved basic unit is designed that incorporates to as great an extent as possible fundamental characteristics that are common to all three attachments so that these characteristics need not be built individually into the attachments. Therefore, the interchangeability of the attachments becomes quite a simple matter and the basic unit therefore has considerable flexibility and versatility.

According to the invention, one of the principal objects is the design of a base unit having a stub frame on which any one of three attachments may be mounted. It is a further object to equip the stub frame with a conveyor that has a rear end delivering into crop-receiving means on the base frame, such means taking the form of a housing in which the collected crops are reduced and then delivered into a convenient receptacle for storage. The conveyor extends forwardly and downwardly and is designed so that the initial crop-moving means of any one of the attachments can deliver directly thereto. It is a further feature of the invention to arrange the pivotal connection of any one of the attachments in such manner that vertical adjustment of the attachment has little, if any, effect on the crop-transfer relationship between the crop-moving means of the attachment and the conveyor on the stub frame. A still further object of the invention is to equip the base unit with a rockable member on the stub frame, which rockable member may be readily connected to any one of the attachments for vertically adjusting the same. It is still another object of the invention to provide the stub frame with a power output member that may be connected to any one of the attachments, all of which considerably simplifies the attachments and eliminates the need for repeating many of the structural characteristics common to the attachments.

It is an object in general to improve the over-all design and construction of a forage harvester of the character referred to, various phases of the invention residing in combinations and subcombinations as set forth in the appended claims.

Another object is to drive the conveyor in timed relationship to the feed rolls so as to improve the feeding characteristics of the machine. Still another object is to overcome the loss of material usually experienced in the transfer of material from the attachment to the conveyor.

The foregoing and other important objects and desirable features inherent in and encompassed by the invention will become apparent as a preferred embodiment of the invention is disclosed in detail in the following specification and accompanying sheets of drawings, the several figures of which will be briefly described immediately below.

Fig. 1 is a perspective view of the base unit.

Fig. 2 is a perspective view of a pickup attachment mountable on the base unit.

Fig. 3 is a perspective view of a row-crop attachment mountable on the base unit.

Fig. 4 is a perspective view of a sickle bar attachment mountable on the base unit.

Fig. 5 is a side elevational view, partly in section, showing the base unit with the pickup attachment mounted thereon.

Fig. 6 is a fragmentary perspective view of the bottom portion of the base unit, showing the control means for the rockable tilting member.

Fig. 7 is a fragmentary side elevational view of the right-hand portion of the base unit, drawn to an enlarged scale, showing the relationship between that unit and the rear end of the pickup attachment, portions of the shielding at one side being broken away to expose part of the driving means, the driving means being illustrated schematically for purposes of clarity.

Fig. 8 is an enlarged detail view of one of the attaching means that is common to the connection between any one of the attachment units and the base unit.

Fig. 9 is a fragmentary side elevational view of a rear inner portion of the row-crop attachment, showing the drive therefor.

Fig. 10 is an enlarged fragmentary section on the line 10—10 of Fig. 6.

The base unit, shown best in Fig. 1 comprises a main frame 10 having right- and left-hand sides 12 and 14 and carried on right- and left-hand wheels 16 and 18. The main frame has at its left-hand side a forwardly extending rectangular structure 20 from which a draft tongue 22 projects forwardly for connecting the base unit to a tractor (not shown), all of which is not unfamiliar to those versed in the art. The rectangular frame structure 20 may support an internal combustion engine (not shown) or in the alternative may carry, as shown here, housing and shield means 24 for enclosing a power shaft (not shown) connected at its forward end to a propeller shaft 26, shielded at 28, and connected at its forward end to the tractor power take-off shaft (not shown) in the conventional manner.

Power transmitted by the propeller shaft 26 ultimately reaches a gear casing 30 from which a power input shaft 32 (Fig. 5) extends to the right-hand side of the machine.

The main frame 10 carries rigidly thereon intermediate the wheels 16 and 18 a crop-receiving housing means, designated generally by the numeral 34, comprising upright front and rear walls 36 and 38 forming a crop-reducing chamber within which is journaled a cutter head or rotor 40, the cutter having thereon a plurality of knives 42 cooperating with a stationary cutter bar 44 for reducing crops fed to the housing 34 through a front or forwardly facing inlet opening 46. The reduced crops are discharged tangentially from the housing at the left-hand side thereof via an upwardly and rearwardly curving discharge spout 48. Any suitable means may be provided for driving the cutter head 40 from the drive means previously ascribed as comprising the casing 30 and the shafts 26 and 32.

The crop-receiving housing 34 includes a forwardly projecting feeder housing 50, and a stub frame 52 projects ahead of the feeder housing 50. The feeder housing comprises right- and left-hand side walls 54 and 56 and is open at its front to receive crops and open at its rear to transfer crops into the crop-receiving housing 34 via the crop-inlet opening 46. The feeder housing contains a front movable feed roll 58 of relatively large diameter, a rear movable feed roll 60 and a rear fixed roll 62, the rolls 60 and 62 being considerably smaller than the roll 58. The expression "movable" is used with reference to the ability of the rolls to change positions to accommodate varying quantities of crops fed past them. All of the rolls are, of course, rotatable.

One of the features of this invention is to provide on the stub frame 52 a rearwardly moving conveyor means, designated generally by the numeral 64, preferably comprising an endless belt, slatted-type conveyor having upper and lower runs 66 and 68 and front and rear portions 70 and 72. The rear end of the stub frame 52, as at 76, may be an integral part of the feeder house 50 and the forward end of the stub frame, as at 74, projects a substantial distance ahead of the feeder housing 50. The front and rear ends of the conveyor 64 are substantially coincident with the front and rear end portions of the stub frame 52. As best shown in Fig. 1, the stub frame has right- and left-hand sides 78 and 80 between which the conveyor 64 runs.

The conveyor 64 is carried by front, intermediate and rear cross shafts 82, 84 and 86, respectively. These shafts respectively carry rotary members or sprockets 88, 90 and 92, which serve as means for supporting the conveyor 64. The rear and intermediate shafts 86 and 84 are at approximately the same level and the front shaft 82 is at a lower level, thus giving the conveyor a rear portion 94 that is substantially horizontal and a forward portion 96 that inclines downwardly and forwardly. The shaft 84 is vertically intermediate the upper and lower runs 66 and 68 of the conveyor 64 or, figuratively speaking, intersects the conveyor.

The intermediate shaft 84 has right- and left-hand ends 98 and 100 that project laterally outwardly respectively beyond the right- and left-hand sides 78 and 80 of the stub frame 52. These ends 98 and 100 provide trunnions which afford radially exposed, forwardly facing bearings for the pivotal and removable mounting of any of the attachments shown in Figs. 2, 3 and 4, the details of which will be set forth below.

It is another feature of the invention that the shaft 84 is not only supported in the stub frame 52 but includes at its left-hand end a coaxial extension 102 which is supported in brackets 101 and 103 on a portion of the main frame 10 disposed alongside the stub frame. A sleeve 105 is journaled on the extension 102 and to this sleeve are keyed rotary output members 104 and 106 and an input sheave 110. The main power shaft 32 has a sheave 108, and a drive belt 112 is trained about the sheaves 108 and 110 (Figs. 5 and 7) to drive the sleeve 105 on which the output members 104 and 106 are available for driving drivable parts of any one of the three attachments shown in Figs. 2, 3 and 4. The belt 112 and sheaves 108 and 110 are covered by a safety shield 113.

Drive from the shaft 32 to the conveyor and feed rolls is established as follows, reference being had to Fig. 7. The shaft 32 has keyed to the right-hand end thereof a driving sprocket 114 connected by a chain 116 to a large driving sprocket 118 keyed to a countershaft 120. The sprockets 114 and 118 are respectively removable from their shafts and replaceable on the other shafts to vary the ratio between the shafts 32 and 120.

A second sprocket 122 keyed to the countershaft 120 is the source of power for the various rolls and conveyor 64. A relatively large sprocket 124 is journaled on the right-hand end of the shaft 32. Sprockets 126 and 128 are keyed respectively to the right-hand ends of a shaft 130 for the feed roll 62 and on the rear conveyor cross shaft 86. A sprocket 132 is carried by an idler shaft 134 and a chain tightener sprocket 136 completes the sprockets at the right-hand side of the machine. A drive chain 138 is trained about the sprockets 122, 124, 126, 136, 132 and 128, and the drive is such that the feed roll 62 and conveyor 64 are driven in the directions of the respective indicating arrows. It will be noted that the shaft 84 has the triple function of supporting the conveyor 64, providing the pivots or trunnions 98 and 100 and serving as a support for journaling the drive unit comprising the input member 110 and the output members 104 and 106.

The idler shaft 134 carries a second sprocket 140 joined to the sprocket 132 for rotation therewith, and a chain 142 connects this sprocket 140 and a sprocket 144 keyed to the right-hand end of a shaft 146 for the upper feed roll 60. The shaft 146 extends across to the left-hand side of the feeder house 50 and has keyed thereto a sprocket 148 which, through the medium of a chain 150, drives a sprocket 152 keyed to a transverse shaft 154 on which is mounted the front movable or large feed roll 58.

Still another feature of the invention is means on the stub frame for tilting or vertically adjusting any one of the attachments of Figs. 2, 3 or 4. This means comprises a transverse rockable member or rockshaft 156 carried in suitable right- and left-hand bearings 158 and 160 at the front end 74 of the stub frame 52. The rockshaft has fixed thereto force-transmitting means in the form of right- and left-hand arms 162 and 164. The main frame of the base unit carries means thereon for applying force to the rockshaft 156. This means preferably takes the form of a manually operated screw jack 166 anchored at one end to a fixed bracket 168 on the tongue 22 (Fig. 6) and connected at its other end to a lever 170 pivoted on the tongue at 172. A cable 174 is connected at one end to the lever 170 and is connected at its other end to an arm 176 rigidly connected to the left-hand end of the tilting or adjusting rockshaft 156, intermediate portions of the cable being trained about sheaves 178 and 180 journaled on the main frame in laterally spaced relation. The intermediate portions of the cable are shown here as being supplanted by short lengths of chain 182 and 184 to facilitate operation of the adjusting means. An assist spring 186 cooperates between the main frame and the arm or lever 176 to aid in tilting of the rockshaft 156 in a counterclockwise direction as viewed in Figs. 5 and 7. The screw jack 166 could, of course, be replaced by any other suitable power-applying means.

The right-hand side of the feeder house 50 is augmented by a cover or shield 187, portions of which are broken away in Fig. 7 to expose the drive previously described.

The pickup attachment shown in Fig. 2 involves conventional construction in many respects, having right- and left-hand laterally spaced and upright forward wall portions 188 and 190 between which is pickup mechanism 192 that delivers upwardly and rearwardly to an upwardly and rearwardly inclined deck 194. Front and rear overhead feeders 196 and 198 combine with the deck 194 to constitute rearwardly and upwardly moving crop-moving means drivable by means of a shaft 200 on which the rear feeder 198 is mounted. As shown in dotted lines in Fig. 5, the feeders 196 and 198 are connected for operation in unison by means of front and rear sprockets 202 and 204 interconnected by a chain 206. This mechanism is concealed by a shield 208 in Fig. 2. The shaft 200 is driven from the output member 106 by a chain 201.

Fig. 5 shows that the deck 194 has a rear portion 210 that delivers onto the conveyor 64. Hence, when the pickup attachment is mounted in position on the base unit, the pickup mechanism and feeders 196 and 198 cooperate to deliver crops upwardly and rearwardly to the conveyor 64, whence the crops are passed through the feed rolls 58, 60 and 62 and into the housing 34 to be reduced and discharged by the rotor or cutter head 40. In this respect, the machine functions as well as a machine specifically designed without regard for the further use of the base unit with other attachments. This desirable characteristic of the machine is made possible on the basis of the features previously outlined, particularly the association between the crop-delivery deck 194 and the stub frame conveyor 64.

The pickup attachment is readily mountable on and dismountable from the base unit by means of right- and left-hand attaching means, the right-hand means being shown at 212 in Figs. 2 and 7 and the left-hand means being shown at 214 in Fig. 8 for purposes of elaboration of its details. Since the means 212 and 214 are identical, and since the view in Fig. 8 lends itself better to detailed description, only the means 214 will be described, it being understood that both means have the same parts and that both cooperate respectively with the trunnions or pivots established at 98 and 100 by the projecting ends of the transverse intermediate shaft 84.

The means 214 (as well as the means 212) comprises essentially a bracket part 216 apertured at 218 to receive bolts (such as shown at 220 in Fig. 7) for mounting the bracket on the respective rear end portion of the pickup attachment. The rear portion of the bracket 216 is bifurcated at 222 to present a hemicylindrical bearing surface for receiving the proximate trunnion 100. The bifurcated portion has an upper furcation 224 curved as indicated to facilitate connection of the bracket to the trunnion. The lower furcation, as at 226, is slotted to receive a locking pin 228 that is pivoted at its upper end at 230 to the upper furcation. The lower end of the pin 228 has a washer 232 between which and a second washer 234 a coil compression spring 236 is confined. The rear portion of the lower furcation 226 has a depending integral lug 238 which normally prevents rearward swinging of the pin 228 to the dotted-line position of Fig. 8. However, when the washer 234 is drawn downwardly against the spring 236, it will clear the lug 238 and the pin can be swung to the rearward position, it being understood that the pin can be swung high enough to clear the bifurcated portion 226 for accepting the trunnion. After the trunnion is received and seated, the pin 228 is returned to its original position, the washer 234 being drawn downwardly against the spring 236 so that it clears the lug 238 in its forward travel, after which the washer is released and the spring 236 confines the pin in its locked position.

After the pickup attachment has been pivotally mounted on the trunnions 98 and 100, drivable crop-moving means 196—198 of the pickup attachment is connected to the power-output means on the stub frame and the stub frame rockshaft 156 is connected to the pickup attachment so that the latter may be adjusted vertically about the trunnions 98 and 100. The driving connection is established between the output member 106 and the rear feeder shaft 200 by the chain 201 as previously described. Each of the depending arms 162 and 164 on the tilting rockshaft 156 of the base frame is connected to a forward portion of the pickup attachment by a forwardly extending push member 242 (Fig. 5). When it is desired to remove the pickup attachment, it is necessary merely to release the pins 228 in the attaching means 212 and 214, to disconnect the drive chain 240 and to disconnect the push members 242, all of which is a relatively simple procedure.

The row-crop attachment shown in Fig. 3 may be considered to be fundamentally of conventional construction, comprising right- and left-hand gatherer sheets 244 and 246, each of which is associated with right- and left-hand gatherer chains 248 and 250 to establish therebetween a crop-receiving throat 252 through which crops move rearwardly and upwardly because of the rearward and upward inclination of the gatherer chains 248 and 250. Thus, as in the case of the pickup attachment in Fig. 2, the row-crop attachment of Fig. 3 has crop-moving means having a rear end adapted to discharge onto the conveyor 64 of the stub frame 52, the relationship of which will be appreciated on the basis of the description of the mounting of the row-crop attachment taken in conjunction with general knowledge of row-crop attachments. The row-crop attachment has at its rear end a pair of attaching means like those described at 212 and 214 for the pickup attachment. Only one of these is visible in Fig. 3 and is designated at 212a. Fig. 9 shows a view of a rear portion of the row-crop attachment from the left-hand side, illustrating one of the gatherer chains 250 and the manner in which it is driven. The view illustrates a pair of rearwardly and upwardly inclined frame members 254 at the rear ends of which is carried a gear case 256 having an output shaft 258 on which is keyed a sprocket 260 for carrying the upper end of the gatherer chain 250. The output shaft is driven by suitable gearing (not shown) contained within the casing 256 and powered in the first instance by an input shaft 261 connected by a chain 262 to the rotary power output member 104 of the stub frame. The chain 262 is trained about additional sprockets 264 which have no particular significance here.

The sickle bar attachment shown in Fig. 4 follows generally the design of the pickup attachment of Fig. 2, with the exception that it has a transverse sickle or cutter bar 266 extending between right- and left-hand side sheets 268 and 270 and a reel 272 operative over the sickle bar 266. The attachment further has a rear overhead feeder 274 very similar to the rear feeder 198 of the pickup attachment. The overhead feeder 274 is carried on a central shaft 276 at the left-hand end of which is keyed a sprocket 278 for furnishing power to a reel sprocket 280 by means of a driving chain 282. When the sickle bar attachment is mounted on the stub frame, as by means of mounting brackets like those described in connection with the pickup attachment, and designated in Fig. 4 by the numeral 212b, the overhead feeder shaft 276 is connected to the stub frame power output member 104 as by means of a chain similar to the chain 201. The sickle bar attachment has a deck 284 that inclines upwardly and rearwardly to a rear discharge end very similar to that at 210 for the pickup attachment, and the crop-moving means comprising the reel, the deck and the overhead feeder 274 operate, as in the cases of the feeders and deck in the pickup attachment and the gatherer chains and side sheets in the row-crop attachment, to deliver crops onto the rearwardly moving stub frame conveyor 64.

Both the row-crop attachment and the sickle bar attachment are adjustable by means of power derived from the tilting rockshaft 156 and its arms 162 and 164, push bars similar to those at 242 being used. In all instances, the attachments may readily "float" relative to the main frame about the pivot 84 as uneven ground contour is encountered.

As will be seen from the foregoing, the flexibility or versatility of the base frame is materially increased by equipping it to as great extent as possible with basic features that are usable with all three of the attachments, rather than to complicate the individual design of each attachment and to then attempt to make it fit a base unit.

Various other features of the invention not specifically enumerated herein will undoubtedly occur to those versed in the art, as will many modifications and alterations in the preferred embodiment of the invention, all of which may be achieved without departure from the spirit and scope of the invention.

What is claimed is:

1. A forage harvester base unit for selective use with harvesting attachments of both the row-crop and field-crop type, comprising: a mobile main frame having crop-receiving means provided with a crop-inlet opening; a forwardly projecting stub frame rigid on the main frame and having laterally spaced apart opposite sides, a rear portion proximate to the crop-inlet opening and a front portion spaced ahead of the crop-inlet opening; a fore-and-aft extending endless conveyor between the sides of the stub frame and having front and rear ends respectively proximate to the front and rear portions of the stub frame, said conveyor running rearwardly and having its rear end arranged to discharge into the crop-inlet opening; front and rear cross shafts journaled respectively in the stub frame front and rear portions and supporting the conveyor respectively at its front and rear ends; means on the stub frame providing a pair of trunnions coaxially spaced apart on a transverse axis approximately at the level of the conveyor and ahead of the rear end and rearwardly of the front end of said conveyor, said trunnions affording, respectively at the sides of the stub frame, radially exposed and forwardly facing bearings adapted to pivotally mount a harvesting attachment of either of the aforementioned types; drive means on the main frame including a driving connection to the conveyor; and a power output member on one of the frames and connected to the driving means and adapted for driving connection to a harvesting attachment mounted on the base unit via the trunnions.

2. The invention defined in claim 1, including: a coaxial extension on one of the trunnions and carrying the power output member.

3. The invention defined in claim 2, including: a main frame portion alongside the stub frame at the side of said stub frame at which the one trunnion has the coaxial extension; and means on said main frame portion carrying said extension.

4. The invention defined in claim 1, in which: the means providing the trunnions comprises a cross shaft on the stub frame intermediate the front and rear cross shafts and having opposite ends projecting respectively laterally beyond the conveyor to serve as said trunnions, and said intermediate cross shaft has means thereon supporting an intermediate portion of the conveyor.

5. The invention defined in claim 4, in which: one end of the intermediate cross shaft has a coaxial extension beyond the proximate trunnion and said extension carries the output member.

6. The invention defined in claim 5, in which: the means supporting the intermediate portion of the conveyor comprises rotary members journaled on the intermediate cross shaft.

7. A forage harvester base unit for selective use with harvesting attachments of both the row-crop and field-crop type, comprising: a mobile main frame having crop-receiving means provided with a crop-inlet opening; a forwardly projecting stub frame rigid on the main frame and having laterally spaced apart opposite sides, a rear portion proximate to the crop inlet opening, an intermediate portion ahead of the rear portion, and a front portion spaced ahead of the intermediate portion; a fore-and-aft endless conveyor between the stub frame sides and having front and rear ends and an intermediate portion respectively proximate to the front, rear and intermediate portions of the stub frame, said conveyor running rearwardly and having its rear portion arranged to discharge into the crop-inlet opening; front and rear cross shafts journaled respectively in the front and rear portions of the stub frame and respectively supporting the front and rear ends of the conveyor; an intermediate cross shaft carried by the intermediate portion of the stub frame and supporting the intermediate portion of the conveyor; the rear and intermediate shafts being at substantially the same level and the front cross shaft being at a lower level so that the conveyor has a rear substantially horizontal stretch between the rear and intermediate cross shafts and a forward downwardly and forwardly inclined stretch between the intermediate and front cross shafts; means on the stub frame providing a pair of trunnions coaxially spaced apart on a transverse axis approximately at the level of the conveyor and substantially transversely alined with the intermediate portion of the conveyor, said trunnions affording bearings adapted to pivotally mount a harvesting attachment of either of the aforementioned types; drive means on the main frame including a driving connection to the conveyor and a power output member connected to the driving means and adapted for driving connection to a harvesting attachment mounted on the base unit via the trunnions.

8. The invention defined in claim 7, in which: the intermediate cross shaft has a coaxial extension on one end thereof, and the output member is carried on said extension.

9. The invention defined in claim 7, in which: the trunnions are coaxial with the intermediate cross shaft.

10. A forage harvester base unit for selective use with harvesting attachments of both the row-crop and field-crop type, comprising: a mobile main frame having crop-receiving means provided with a crop-inlet opening; a forwardly projecting stub frame rigid on the main frame and having laterally spaced apart opposite sides, a rear portion proximate to the crop-inlet opening and a front portion spaced ahead of the crop-inlet opening; means on the stub frame providing a pair of harvester-attachment-mounting trunnions coaxially spaced apart on a transverse axis ahead of the crop-inlet opening; and a rearwardly running conveyor carried by the stub frame and substantially intersecting the trunnion axis, said conveyor having a rear end arranged to deliver into the crop inlet opening and a forward end projecting ahead of the trunnion axis for receiving crops from a harvester attachment mounted on said trunnions.

11. A forage harvester base unit for selective use with harvesting attachments of both the row-crop and field-crop type, comprising: a mobile main frame having crop-receiving means provided with a crop-inlet opening; a forwardly projecting stub frame rigid on the main frame and having laterally spaced apart opposite sides, a rear portion proximate to the crop-inlet opening and a front portion spaced ahead of the crop-inlet opening; a cross shaft on the stub frame having coaxially spaced apart opposite ends respectively at the sides of the stub frame and ahead of the crop inlet opening, said shaft ends providing radially exposed and forwardly facing pivot mounts adapted to pivotally mount a harvesting attachment of either of the aforementioned types; a rearwardly running endless conveyor carried by the stub frame and having upper and lower runs respectively above and below the cross shaft, said conveyor having a rear end arranged to deliver into the crop-inlet opening and a front end projecting ahead of the cross shaft for receiving crops from a harvester attachment mounted on said trunnions.

References Cited in the file of this patent

UNITED STATES PATENTS

| | | |
|---|---|---|
| 1,727,616 | Pro | Sept. 10, 1929 |
| 2,629,978 | Krause et al. | Mar. 3, 1953 |
| 2,651,162 | Whisler | Sept. 8, 1953 |
| 2,658,319 | Hansen | Nov. 10, 1953 |
| 2,661,585 | Hansen | Dec. 8, 1953 |